March 17, 1970

C. L. TILLMAN III 3,501,158

TUBULAR SEAL

Filed July 3, 1967

INVENTOR
CASSIUS L. TILLMAN III

BY *Albert J. Kramer*

ATTORNEY

March 17, 1970  C. L. TILLMAN III  3,501,158
TUBULAR SEAL

Filed July 3, 1967  2 Sheets-Sheet 2

INVENTOR
CASSIUS L. TILLMAN III

BY Albert J. Kramer
ATTORNEY

United States Patent Office 3,501,158
Patented Mar. 17, 1970

3,501,158
TUBULAR SEAL
Cassius L. Tillman III, % Precision Engineering Inc.,
P.O. Box 808, Harvey, La. 70058
Filed July 3, 1967, Ser. No. 650,691
Int. Cl. F16j 9/00; F16r 41/00
U.S. Cl. 277—171                                6 Claims

ABSTRACT OF THE DISCLOSURE

A ring seal for the joint between two tubular members has a convex surface adapted to be disposed in adjacent interior recesses of the joint between the tubular members. Portions of the seal have diameters different from that of the adjacent parts of the recesses to require stressing within the elastic limit of the seal to seat the seal in the recesses. A surface coating may be applied to the seal of a relatively soft material so as to be redistributed under pressures between the seal and the recesses in order to provide a more effective sealing.

This invention relates to seals and it is more particularly concerned with seals for the joints of tubular members.

An object of the invention is the provision of a ring seal between adjacent tubular members which is resiliently yieldable so as to be stressed under pressure of parts of tubular members against which it is in contact and which is adapted to conform to contacting surfaces with said parts.

Another object is the provision of a ring seal of the type mentioned having surface flow means which causes a redistribution of material between the seal and the tubular members to increase the effectiveness of the seal.

A still further object is the provision of a ring seal having means to facilitate its correct placement between the tubular members.

These and still further objects, advantages and features of the invention will be apparent from the following description considered together with the accompanying drawing.

Figures 1, 2:
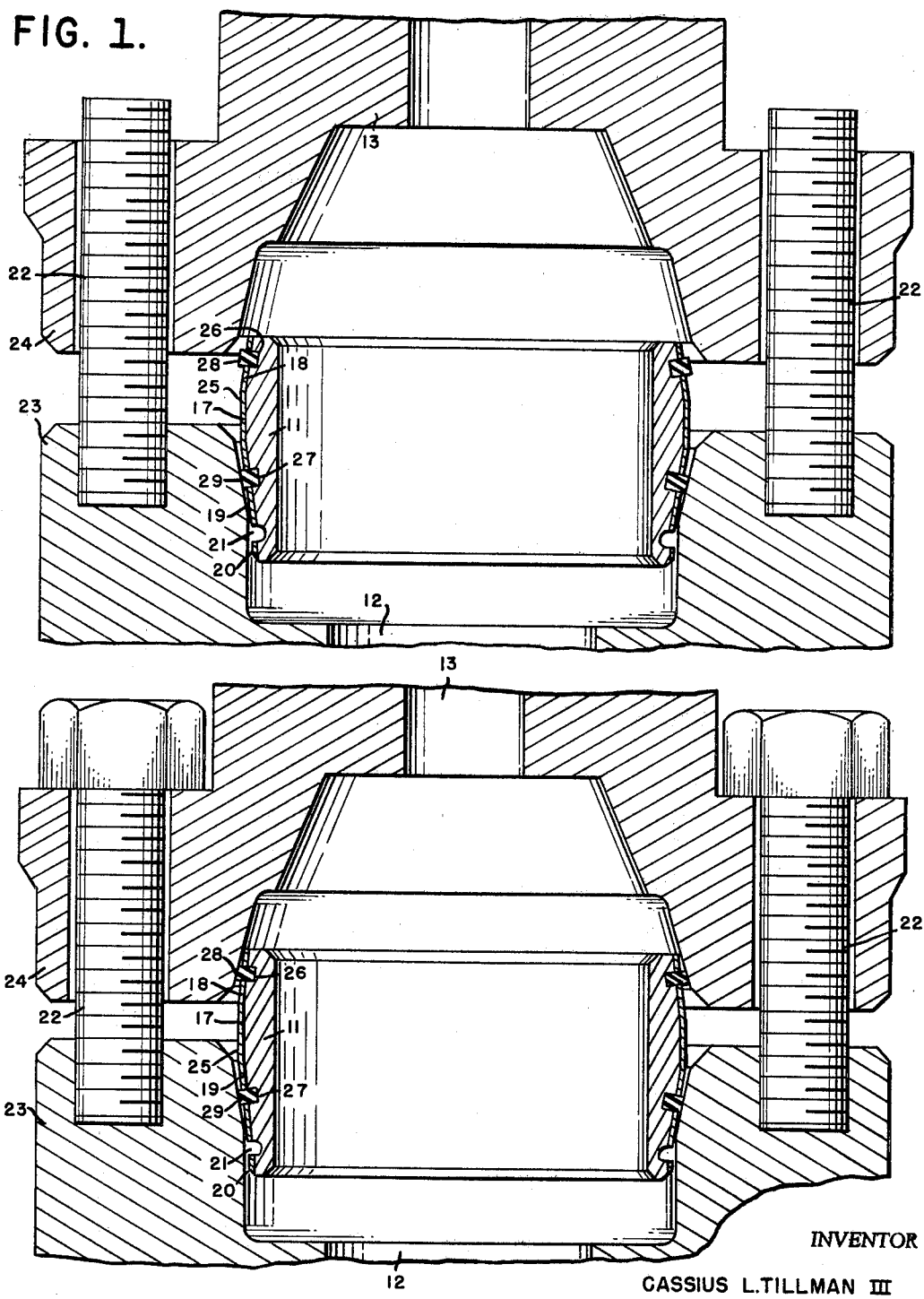
FIG. 1 is a longitudinal sectional view of an embodiment of the invention in relation to a tubular joint with the two parts of the joint separated.
FIG. 2 is a view similar to FIG. 1 with the two parts of the joint in an intermediate position.
Figure 3:
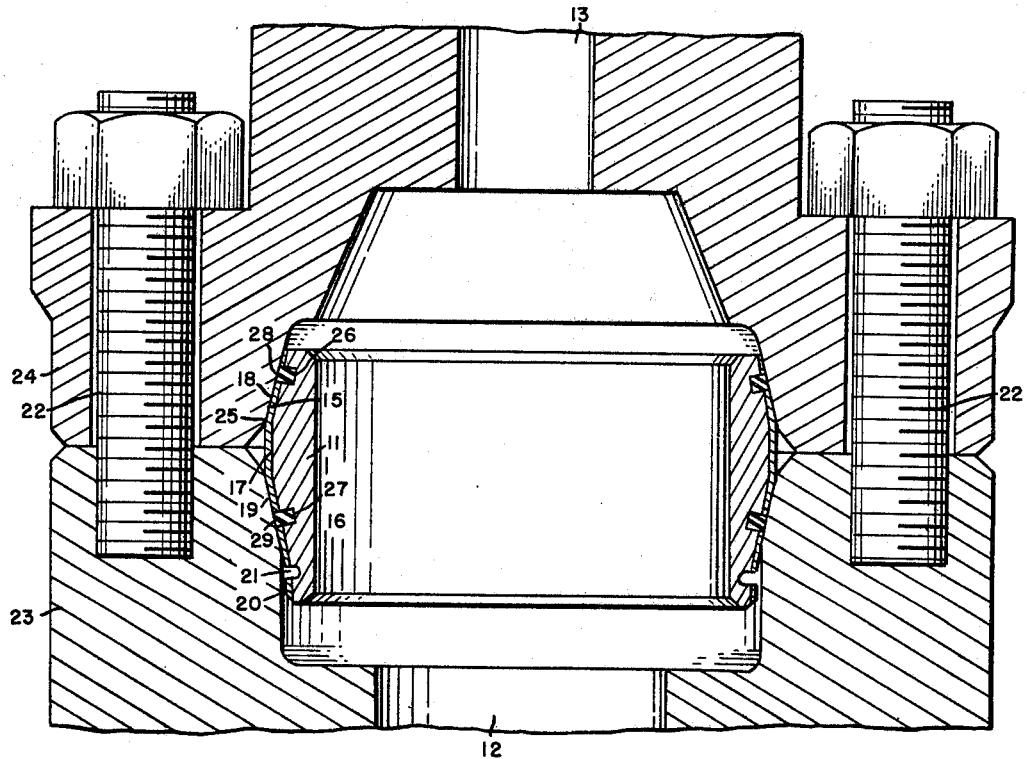
FIG. 3 is a view similar to FIG. 1 and FIG. 2 with the two parts of the joint in final position.
Figure 4:
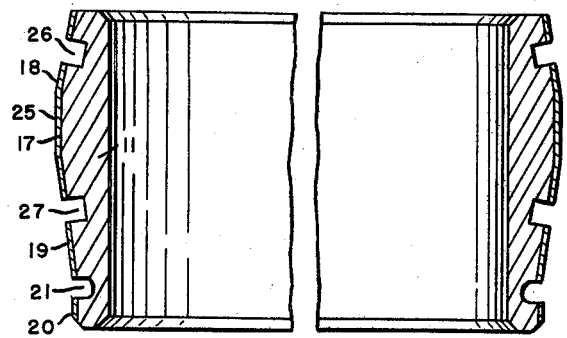
FIG. 4 is a longitudinal sectional view of the embodiment apart from the joint.

Referring with more particularity to the drawing in which like numerals designate like parts, the embodiment illustrated comprises a ring 11 adapted to be disposed on the interior across the joint of two adjacent tubular members 12 and 13.

The member 11 has substantial thickness and a generally convex section 14 adapted to be disposed in concave recessed portions 15 and 16 of the members 12 and 13. The convex section comprises a median portion 17 parallel to the longitudinal axis of the ring 11 and end tapering portions 18 and 19. An extension 20 is provided for the tapered portion 19 generally parallel to the longitudinal axis of the ring 11. The extension 20 is provided with an annular groove 21 of sufficient depth to provide flexibility of the extension.

The concave recessed portion 15 is of a slope different from, preferably greater than, the slope of the portion 18 by about one degree, and the recessed portion 16 is of a slope different from, preferably greater than, the slope of the portion 19 by about one degree. The purpose of these differences in slopes is to create diameter interference between the recesses of the tubular members and the portions 18 and 19 so that when the tubular ends are tightened under the force of the studs 22 acting against flanges 23 and 24, the ring member will be stressed in an amount within its elastic limit against the respective portions 15 and 16.

Other means of providing diameter interference may also be used, such as making the overall diameters of the ring member parts 18, 19 slightly greater than that of the recesses 15, 16.

The extension 20 is adapted to function as a guide for the proper placement of the ring 11 in the recess 16. See FIG. 1. The groove 21 permits distortion of one part of the ring if required without substantially affecting the other part.

The outer concave section 14 of the ring 11 is coated with a material 25 (shown exaggerated) flowable under the surface pressures between the ring and the recesses. Suitable coating materials comprise but are not limited to metals, such as zinc, copper, silver, lead, cadmium and nonmetallic materials such as Teflon, Hycar, rubber, etc. The purpose of this coating is to form a flowable surface medium which will be redistributed in inverse proportion to the pressures applied along the adjacent surfaces and thereby provide a more effective seal.

At the outer ends of sections 18, 19 there are provided annular grooves 26, 27 for the reception of rubber seal rings 28, 29, respectively, on either side of the joint of the tubular members 12, 13.

What is claimed is:

1. The combination of two joined tubular members and a joint seal therefor, said tubular members having their adjacent ends in abutting relation and having adjacent interior recesses comprising together an annular inwardly divergent wedge-shaped configuration and a metallic ring member adapted to be seated on said recesses, said ring member having a generally convex exterior surface corresponding to said divergent configuration, and having also a free extension, said extension having a radial annular groove adjacent its inner end to provide a degree of relative yieldability between the extension and the remaining portion of the metallic ring member, said divergent configuration being continuous with the interior surface of the tubular members, respectively, the shape of the convex exterior surface comprising a central flat section generally parallel to the longitudinal axis of the ring member, and inwardly converging tapered sections at either side of the central flat section of a slope less than that of the ring member.

2. The combination as defined by claim 1 in which the recesses have a divergent configuration corresponding to but of a slope different than the inwardly converging tapered sections of the ring member.

3. The combination as defined by claim 2 in which the slope of the first configuration is less than that of the inwardly converging tapered sections.

4. The combination as defined by claim 1 in which the outer convex surface of the ring member is coated with a material flowable under pressure of the joint.

5. The combination as defined by claim 4 in which the flowable material is selected from the group consisting of zinc, copper, silver, lead, cadmium, Teflon, Hycar, and rubber.

6. The combination as defined by claim 1 in which the ring member comprises annular grooves on either side of the joint between the two tubular members and yieldable sealing rings in said grooves.

References Cited

UNITED STATES PATENTS

| | | | |
|---|---|---|---|
| 951,704 | 3/1910 | Schmidt | 285—334.4 X |
| 2,775,471 | 12/1956 | Douglass | 285—334.2 X |
| 3,285,615 | 11/1966 | Trbovich. | |
| 1,825,962 | 10/1931 | Laird | 277—168 |
| 2,126,505 | 8/1938 | Risser | 277—206 X |
| 2,552,750 | 5/1951 | Thornhill | 277—171 |
| 3,062,565 | 11/1962 | Word | 285—336 X |
| 3,204,971 | 9/1965 | Meriano | 277—171 |
| 3,325,176 | 6/1967 | Latham et al. | 277—236 X |

FOREIGN PATENTS 574,154  12/1945  Great Britain.

SAMUEL ROTHBERG, Primary Examiner

U.S. Cl. X.R.

277—235; 285—334.4